US005521902A

United States Patent [19]
Ferguson

[11] Patent Number: 5,521,902
[45] Date of Patent: May 28, 1996

[54] LOCATION IDENTIFICATION IN A COMMUNICATIONS SIGNALLING NETWORK

[75] Inventor: Toby H. Ferguson, Cupertino, Calif.

[73] Assignee: Hewlett-Packard Company, Palo Alto, Calif.

[21] Appl. No.: 341,070

[22] Filed: Nov. 17, 1994

[30] Foreign Application Priority Data

Dec. 6, 1993 [EP] European Pat. Off. ............ 93309780

[51] Int. Cl.⁶ .................................................. H04B 17/00
[52] U.S. Cl. ...................... 370/13.000; 370/14; 370/17; 370/110.1; 395/181; 379/1; 379/14; 379/23; 379/25; 379/230; 379/10; 340/827
[58] Field of Search ............................ 379/230, 14, 25, 379/10, 23, 34; 370/13, 17, 14, 110.1; 395/180, 181; 340/827

[56] References Cited

U.S. PATENT DOCUMENTS

| | | | |
|---|---|---|---|
| 4,138,599 | 2/1979 | Munter | 370/13 |
| 5,084,816 | 1/1992 | Bocse | 395/575 |
| 5,195,085 | 3/1993 | Bertsch et al. | 370/13 |
| 5,315,580 | 5/1994 | Phaal | 370/13 |
| 5,408,461 | 4/1995 | Uriu et al. | 370/14 |
| 5,457,729 | 10/1995 | Hamann et al. | 370/13 |

FOREIGN PATENT DOCUMENTS 886454.3   6/1988   Germany.

OTHER PUBLICATIONS

"An Operations Workstation For Network Testing", Fedkamp, pp.1233–1237, Jun. 22, 1986, vol. 2.
"Testbetrieb Des Zentralkanal–Zeichengabe systems NR 7", pp. 279–282, Sep. 1984, Telecom Report, vol. 7, No. 5.
Patent Abstracts of Japan No. 5,022,420.

Primary Examiner—Hassan Kizou
Assistant Examiner—Seema S. Rao

[57] ABSTRACT

A monitor probe for a communications signalling network, such as an SS7 network, is arranged to determine its own location on the signalling network by watching for a particular type of message which carries the required information in its routing label. The routing label of a message is the part of the message indicating the source and destination points for the message as well as providing link-related information for cases where more than one link connects two signalling points. Whilst the routing label of most messages on an SS7 network does not give a reliable indication of the absolute identity of the link on which the message was monitored, in the case of signalling link test messages, the routing label contains the identity of the two points at the end of the link on which the message was monitored as well as the identity of the link as between that link and any other parallel link; these items of information form an absolute identifier for the link which the message was monitored.

4 Claims, 3 Drawing Sheets ially, to a monitor probe that automatically identifies its location in a signalling network operating substantially in accordance with Signalling System No. 7, as specified by the CCITT, such a network being herein referred to as an SS7 network. The CCITT Signalling System Number 7 is specified in Recommendations Q.700–Q.716 CCITT Volume VI—Fascicle VI.7, Geneva 1989, ISBN 92-61-03511-6 which is herein incorporated by reference.

BACKGROUND ART

In modern communications technology it has become common practice to provide two related but separate network infrastructures: a transmission network for carrying end-user data traffic, and a signalling network for controlling operation of the transmission network in accordance with control signals transferred through the signalling network. In practice such signalling networks comprise high-speed computers interconnected by signalling links; computer programs control the computers to provide a set of operational and signalling functions in accordance with a standardized protocol. One example of such a signalling protocol is the afore-mentioned Signalling System No. 7 (SS7) which is being extensively deployed for control of telephone and other data transmission networks. An SS7 network basically comprises various types of signalling points, namely, signalling end points (SEPs) and signalling transfer points (STPs) interconnected by signalling links, the SEPs being associated for example with respective service switching points (SSPs) of the transmission network, and service control points (SCPs).

The large size and complexity of the transmission network entails a correspondingly large and complex signalling network, controlled by very sophisticated computer programs. The complexity of signalling networks is increased by the need to provide redundancy to ensure that failure of a single component of the network does not cause failure of the entire network, and thus of the associated transmission network. Thus, for example, it is common in SS7 networks to provide each SSP or SCP with at least two signalling links to respective members of a pair of geographically-separated STPs.

In order to be able to carry out independent monitoring of the signalling network, monitor probes may be temporarily or permanently installed on one or more links to monitor messages flowing on the link or links. By monitoring these messages it is possible to gain an insight into the behaviour of the network and to detect faults. One example of a monitor probe is the Hewlett-Packard 37900B Signalling Test Set.

When a monitor probe is permanently or semi-permanently installed on a link, generally provision is made to have the probe send the results of its monitoring operations automatically to a remote management station; this station may also be able to control the probe to change the focus of its monitoring activities. Of course, for the results coming from a probe to be useful to the management station, the location of the probe, in terms of the absolute identity of the link on which it is installed, must be made known to the management station. This is generally done by having the installing technician communicate this information to the management station. This can take a considerable time and is prone to errors.

It is an object of the invention to facilitate the identification of the link on which a monitor probe is installed.

SUMMARY OF THE INVENTION

According to the present invention, the monitor probe is arranged to determine its own location on the signalling network by watching for a particular type of message which carries the required information in its routing label. The routing label of a message is the part of the message indicating the source and destination points for the message as well as providing link-related information for cases where more than one link connects two signalling points. Whilst the routing label of most messages on an SS7 network does not give a reliable indication of the absolute identity of the link on which the message was monitored, in the case of signalling link test messages, the routing label contains the identity of the two points at the end of the link on which the message was monitored as well as the identity of the link as between that link and any other parallel link; these items of information form an absolute identifier for the link on which the message was monitored.

Thus according to one aspect of the present invention, there is provided a monitor probe for monitoring a selected link of an SS7 network, the probe being operative to detect a signalling link test message on said selected link and to read and subsequently use the contents of the routing label of that message as an absolute identifier of said selected link.

The invention is, infact, applicable to any item of apparatus that is to be connected to an existing signalling link; where such apparatus is not itself monitoring apparatus, then appropriate monitoring means will need to be provided.

Thus, according to another aspect of the present invention, there is provided a apparatus intended for connection to an SS7 link carrying messages each including a routing label, these messages including signalling link test messages, said apparatus comprising;

interface means for interfacing the apparatus to an SS7 signalling link, monitoring means connected to the interface means for monitoring messages on the signalling link to which the apparatus is interfaced, the monitoring means including link-identity detector means responsive to the presence of a said signalling link test message on the link to read and store the contents of the routing label of that message as an absolute identifier of the link, and reporting means for sending said absolute identifier to a remote management station to inform the latter as to which link the apparatus is interfaced.

The absolute identifier of the link can be sent to the management station each time any information is passed to the station from the apparatus. Alternatively, this absolute identifier can be sent once along with an apparatus identifier that is then used in all subsequent communications with the management station; this approach is preferred because it enables the management station to distinguish between multiple items of apparatus installed on the same link.

According to a further aspect of the present invention, there is provided apparatus intended for connection to a telecommunications signalling network, said network being of the type having a plurality of signalling points interconnected by signalling links with at least certain of said signalling points being directly interconnected by more than one link in parallel, the network being arranged to carry messages of several different types with each message including both message type information as well as routing information, said routing information identifying for at least one message type, but not all said types, the signalling points directly connected by the link carrying the message concerned and the identity of that link as between that link and any other parallel link; said apparatus comprising:

interface means for interfacing the apparatus with a said signalling link;

monitoring means connected to the interface means for monitoring messages on the link to which the apparatus is interfaced, said monitoring means including link-identity detector means responsive to the presence of a message of a said at least one message type on said link, to read, as an absolute link identifier for the link carrying the message, the routing information contained in the message, and means for reporting to a remote management station the read-off absolute link identifier.

BRIEF DESCRIPTION OF DRAWINGS

A monitor probe embodying the present invention will now be described, by way of non-limiting example, with reference to the accompanying drawings, in which.

BEST MODE FOR CARRYING OUT THE INVENTION

Figure 1:
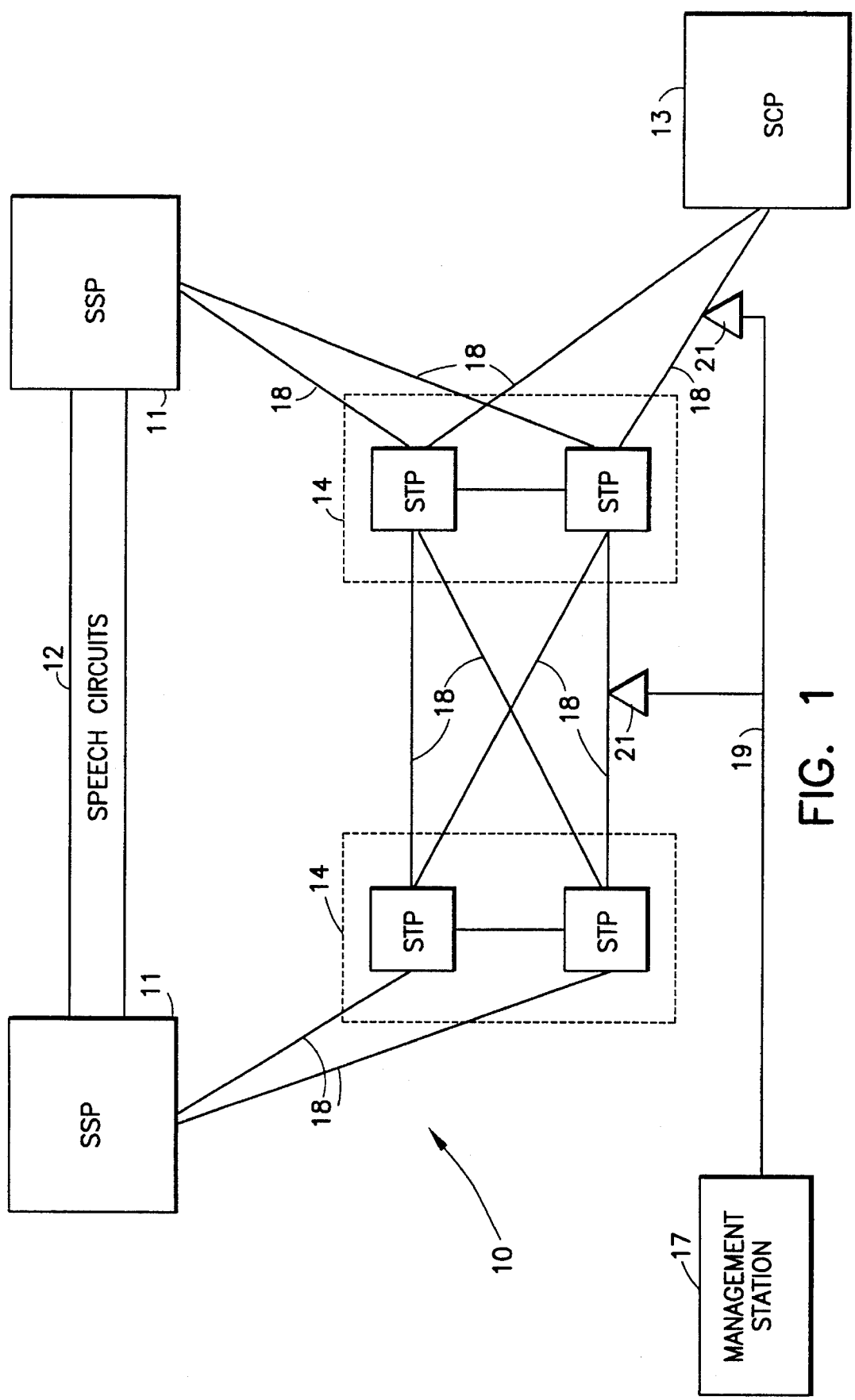
FIG. 1 is a schematic diagram of a part of an SS7 signalling network.

Referring to FIG. 1, an SS7 network 10 is shown communicating three signalling end points constituted by two service switching points SSPs 11 (between which pass speech circuits 12 of a transmission network not further illustrated) and a service control point SCP 13 that can control the operation of the SSPs to provide special services. The SS7 network 10 includes two pairs 14 of signalling transfer points STPs, and a plurality of link sets 18 interconnecting the SSPs, SCP and STPs into a redundant network. Each signalling link set 18 is made up of one or more individual signalling links, the number of signalling links in a link set being chosen to provide appropriate capacity for the level of signalling traffic expected.

It should be noted that an SS7 network belonging to an individual transmission network operator will typically comprise more STP pairs, SSPs and SCPs than illustrated.

Messages traversing the links of the network may be any of a large number of different types, depending on the nature of the call to which the message relates and the function specified by the message. As will be more fully described below, each message includes information identifying its type and a routing label identifying the source and destination of the message.

In order to monitor the behaviour of the SS7 network 10, monitor probes 21 are provided; in FIG. 1, two such probes are shown. These probes are associated with respective signalling links and are connected to a management station 17 that serves to collect and analyse the outputs of the probes 21. The management station 17 may also be arranged to control the configuration of each probe 21 to set the probes up to monitor particular events on the network 21. In the present example, the probes 21 and station 17 inter-communicate over a network 19 (e.g. a LAN) distinct from the SS7 network; however, it would be possible to arrange for the probes 21 and station 17 to inter-communicate over the SS7 network itself by connecting the probes 21 and station 17 to their nearest signalling points of the SS7 network. In this latter case, information is passed between the probes 21 and station 17 in SS7 messages that are encoded and decoded by the associated signalling points.

Figure 2:
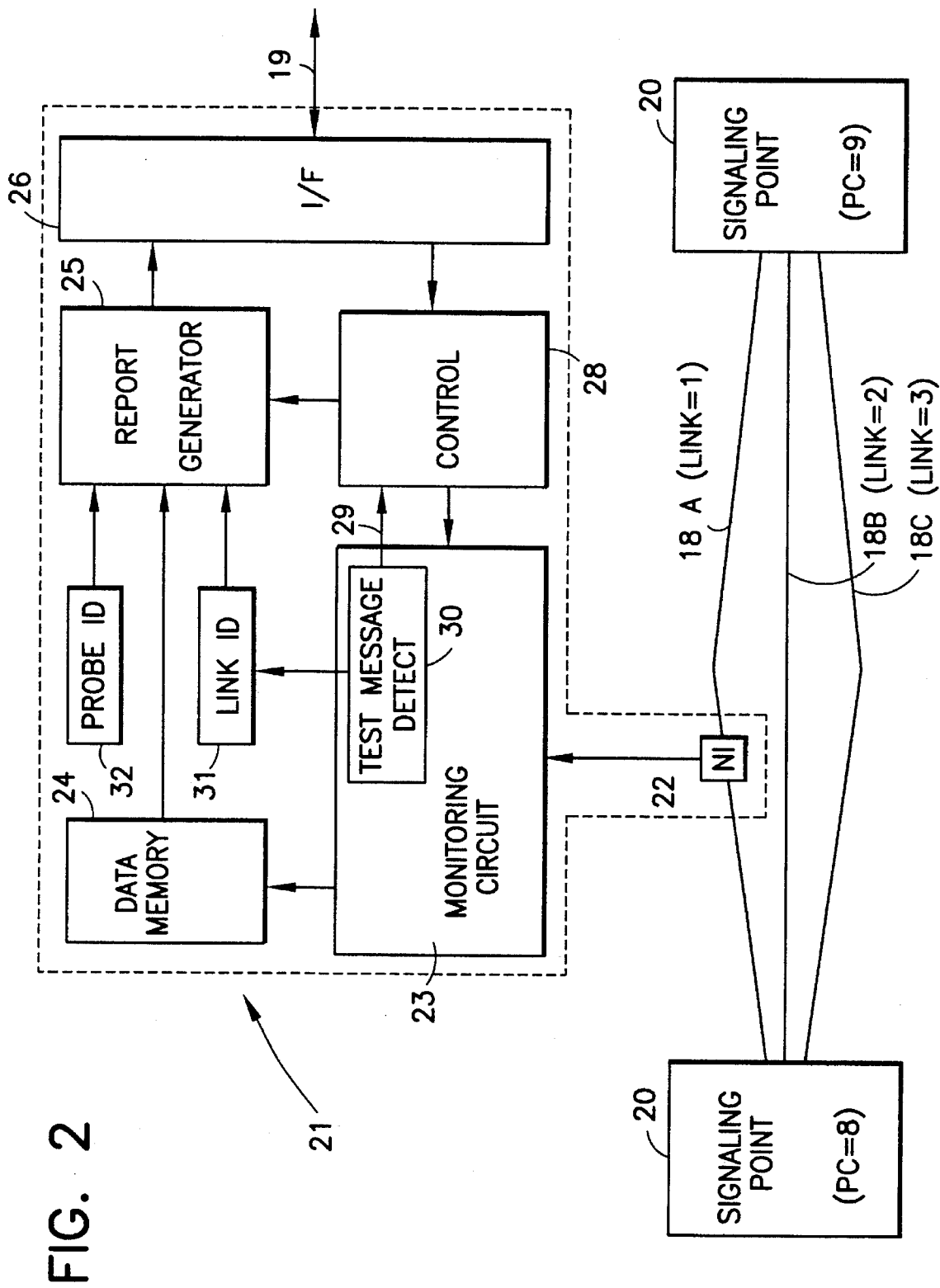
FIG. 2 is a block schematic diagram of a probe used for monitoring a link of the network shown in FIG. 1.

FIG. 2 shows in more detail the general case of the connection of a monitor probe 21 to one link 18A of a link set 18 that extends between two signalling points 20 (for example, between the SCP 13 of FIG. 1 and one of the associated STPs). The link set 18 of FIG. 2 comprises three links, namely the monitored link 18A and two further links 18B and 18C. The signalling points 20 both identify these links 18A, B, C as the first, second, and third links (LINK=1, 2 or 3) between them.

The signalling points 20 are themselves uniquely identified in the SS7 network 10 by point codes. In the FIG. 2 example, point codes 8 and 9 have been allotted to the signalling points 20 simply by way of illustration (in practice, each point code is specified by 14 bits).

It will be appreciated that any individual link on the network can be uniquely identified by the triplet composed of:

the point code of the signalling point at one end of the link;

the point code of the signalling point at the other end of the link;

the link number within the link set joining the signalling points.

Thus, the link 18A is uniquely identified by the triplet (8, 9, 1).

The monitor probe 21 is operative to automatically ascertain the absolute identity of the link 18A on which it is installed and to pass this information back to the management station 17.

In order to ascertain the absolute identity of the link on which it is installed, the monitor probe 21 monitors the messages on the link to which it is connected. As already noted, each message contains a routing label holding routing information. The format of this routing label is illustrated at 42 in FIG. 3; as can be seen, the routing label comprises 32 bits with 14 bits being allocated to record the point code of the source signalling point (that is, the signalling point sending the message), a further 14 bits being allocated to the point code of the destination signalling point, and 4 bits forming a signalling link selection (SLS) field.

The source and destination point codes in the routing label are, of course, intended to indicate the original starting point and the final destination point of the message rather than next hop beginning and end points. Thus, for most types of messages on an SS7 network, reading the destination and source point codes in the routing label cannot be taken as giving any reliable information about the point codes of the signalling points at either end of the link on which the message was read. Furthermore, the signalling link selection field is in most types of SS7 messages used to indicate a preferred link to be used in transmitting a message; however, there is no guarantee that this link is the one actually used in practice as other factors may intervene to override this preference.

In other words, for most SS7 message types, the monitor probe 21 cannot, by reading the routing label of messages on the link it is monitoring, ascertain the absolute identity of that link. However, for one message type, namely signalling link test messages, the source and destination point codes in the routing label of the message do indeed indicate the signalling points at opposite ends of the link on which the message is monitored. Furthermore, for such signalling link test messages, the SLS field of the routing label actually contains the link number of the link carrying the message as between that link and any other links in the same link set.

The monitor probe 21 may therefore ascertain the absolute identity of the link it is monitoring by detecting signalling link test messages on the link and reading off the routing label of such messages.

Figure 3:
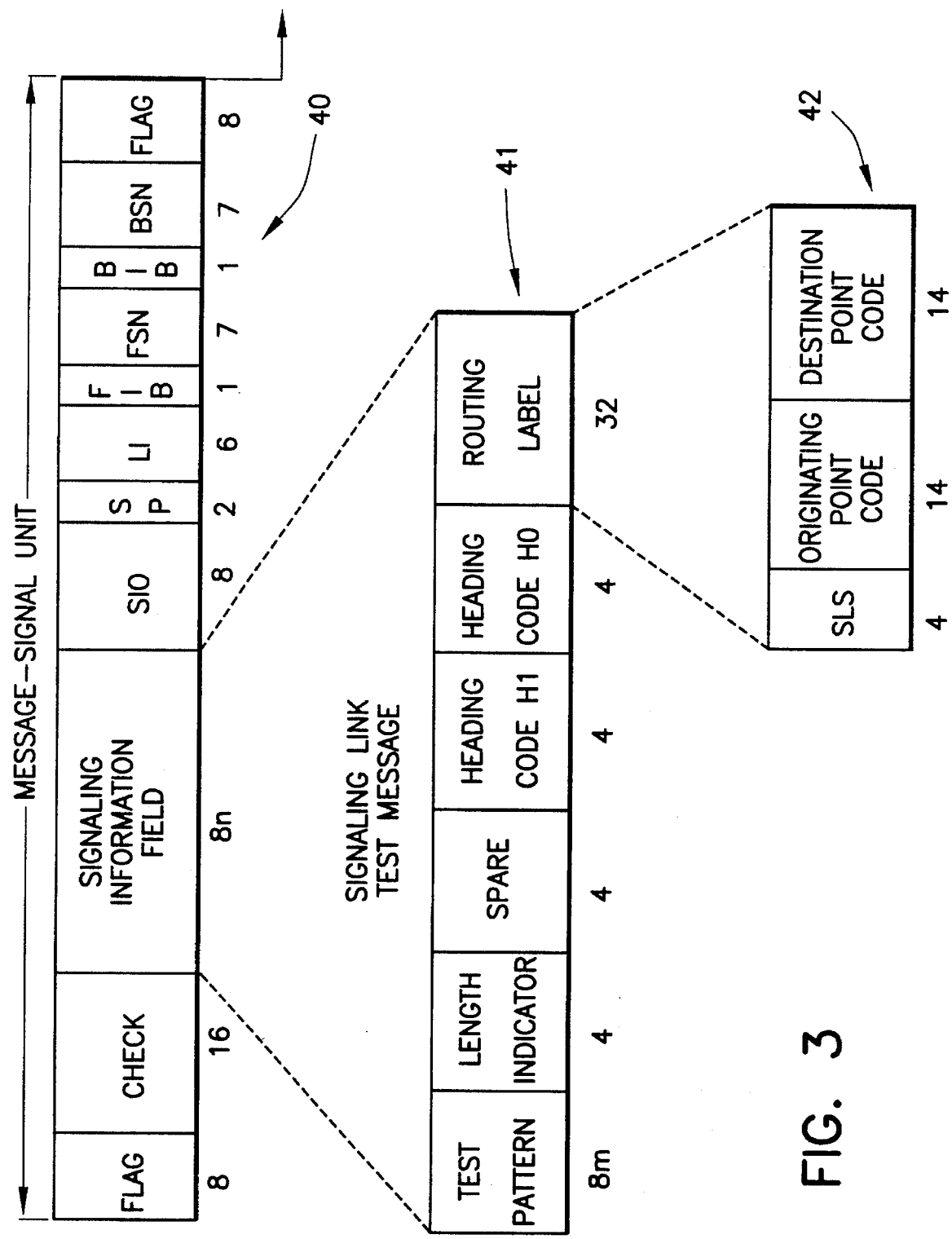
FIG. 3 is a diagram illustrating the composition of a signalling link test message carried by the SS7 network of FIG. 1.

FIG. 3 shows the relevant message formats for signalling link test messages. Thus, at 40, the general format of a SS7 message-signal unit (MSU) is illustrated and, as can be seen, an MSU comprises the following fields:

an 8-bit flag field;

a 7-bit backward sequence number field (BSN);

a backward-indicator bit (BIB);

a 7-bit forward sequence number field (FSN);

a 6-bit link indicator field (LI);

a spare 2-bit field (SP);

an 8-bit service information octet (SIO);

a signalling information field of 8n bits where n is only an integer equal to 2 or more;

a 16-bit check field; and an 8-bit terminating flag field.

Signalling link test messages are contained in the signalling information field of an MSU. The format of a signalling link test message is shown at 41 in FIG. 3. A signalling link test message comprises the following fields:

a 32-bit routing label;

a 4-bit heading code H0;

a 4-bit heading code H1;

a spare 4-bit field;

a 4-bit length indicator; and a test pattern of 8 m bits where m is an integer.

The format of the routing label of the signalling link test message 41 has already been described above with reference to format 42.

Uniquely for signalling test messages, the service indicator of the MSU (that is, the first 4 bits of the SIO field) is set to 0001 and the heading code H0 is set to 0001. By looking for messages with these settings, the monitor probe 21 can identify signalling link test messages.

Further information regarding signalling link test messages can be had by reference to the CCITT recommendations referred to above.

Returning now to a consideration of the FIG. 2 monitor probe 21, the probe is interfaced with the link 18A by a network interface 22 which non-intrusively reads the messages on the link. The output of the network interface 22 is connected to a monitoring circuit 23. The monitoring circuit 23 carries out pre-determined monitoring operations (for example, noting all messages coming from a particular signalling point) and stores the results of its monitoring operations in a data memory 24. The nature of the predetermined monitoring operation may be fixed or may be pre-programmed from the management station 17 by messages passed over the network 19, through an interface 26 of the probe, to a control unit 28 that serves to appropriately program the monitoring circuit 23 for the monitoring operation required.

The data stored in the memory 24 is periodically passed to the management station 17 after formatting in a report generator 25 the output of which is connected to the interface 26. The generation of reports is controlled by the control unit 28 and is effected, for example, at predetermined intervals or in response to a request message received by the control unit 28 from the management station 17.

An identifier for identifying the probe 21 is stored in memory 32. This probe identifier is read by the report generator 25 each time a report is generated and the probe identity is included in each report sent to the management station 17. In this way, the station 17 knows the origin of the report.

The foregoing general operation of the probe 21 is standard and can be readily implemented by persons skilled in the art.

In order to provide for automatic detection by the probe 21 of the absolute identity of the link on which it is installed, the monitoring circuit 23 of the probe is provided with a signalling link test message detection circuit 30 that is operative upon initial installation of the probe to cause the monitoring circuit to respond to the presence of a signalling link test message on the link 18 by reading off the routing label of that message and storing the contents of the label in a link ID memory 31. Once the absolute identity of the link 18A has been determined by the probe 21, the control unit 28 is informed by means of a signal on line 29 from the detection unit 30. Thereafter, the control unit 28 causes the report generator 25 to send a message to the management station 17 including both the probe identity and the absolute link identification information from memory 31.

After the management station 17 has been passed the absolute link identifier together with the probe identity, it can subsequently relate the monitoring data passed to it from the probe to the corresponding link (it being recalled that the monitor data is passed with the probe identity).

Prior to detection of the absolute link identity by the detection circuit 30, the normal monitoring operation of the circuit 23 can be inhibited, although this is not essential. Furthermore, it is also possible to arrange for the detection circuit 30 not only to detect the absolute link identity on initial installation of the probe 21, but also at periodic intervals or on a continuous basis, in which case the management station 17 need only be informed again of the absolute link identity should the latter change.

It will also be appreciated that it is not essential for an initial message to be sent from the probe 21 to the management station 17 relating the probe identity to the absolute link identity as the latter information can be included in each monitored data report sent by the probe to the management station.

Generally, of course, the management station 17 will be receiving reports from a plurality of probes 21. The station 17 may therefore maintain a look-up table in which it stores all the probe identities together with their associated absolute link identifiers.

If an operator at the management station 17 now wishes to send an instruction to a particular monitor probe 21 (for example, to reprogram its monitoring operation), then the operator need only specify the link in which he is interested and the monitoring station itself can automatically determine by reference to its look-up table the identity of the corresponding probe.

It will be appreciated that the use of the term "probe" in relation to the monitor probe 21 carries no special significance other than to indicate apparatus that looks into a network to extract information of interest. Furthermore, as already indicated above, the present invention can also be applied to apparatus other than monitor probes.

I claim:

1. Apparatus intended for connection to a telecommunications signalling network, said network having a plurality of signalling points interconnected by signalling links, the network carrying messages of several different types that are generated during a normal course of operation of said network and independent of said apparatus, with each message including both message type information as well as routing information, said routing information identifying for at least one message type, but not all said types, the signalling points directly connected by a signalling link carrying the message concerned and the identity of that link, said apparatus comprising:

interface means for interfacing the apparatus with said signalling link:

monitoring means connected to the interface means for monitoring messages on the link to which the apparatus is interfaced, said monitoring means including link-identity detector means responsive to a presence of a message of a said at least one message type on said link, to read, as an absolute link identifier for the link carrying the massage, the routing information contained in the message, and means for reporting to a remote management station the read absolute link identifier.

2. The apparatus as recited in claim 1, wherein said network is an SS7 network.

3. Apparatus according to claim 2, wherein the apparatus includes means for storing apparatus identification information relating to the apparatus, said means for reporting sending said apparatus identification information to the remote management station along with said absolute link identifier thereby enabling the management station to associate the apparatus with the link identified by said absolute link identifier.

4. The apparatus as recited in claim 2, wherein at least certain of said signalling points are directly interconnected by more than one link in parallel and said routing information identifies each said link as between that link and any other parallel link.

* * * * *